United States Patent
Wang et al.

(10) Patent No.: US 7,671,487 B2
(45) Date of Patent: Mar. 2, 2010

(54) UNINTERRUPTIBLE POWER SUPPLY AND METHOD FOR CONTROLLING SAME

(75) Inventors: Shyne-Jenq Wang, Taoyuan Hsien (TW); Jen-Chuan Liao, Taoyuan Hsien (TW); Sheng-Hsiu Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 77 days.

(21) Appl. No.: 12/035,246

(22) Filed: Feb. 21, 2008

(65) Prior Publication Data

US 2008/0252144 A1    Oct. 16, 2008

(30) Foreign Application Priority Data

Apr. 13, 2007    (TW) .............................. 96113145 A

(51) Int. Cl.
*H02J 7/00*    (2006.01)
(52) U.S. Cl. ........................................... 307/64
(58) Field of Classification Search .................... 307/64
See application file for complete search history.

(56) References Cited

U.S. PATENT DOCUMENTS

| | | | | |
|---|---|---|---|---|
| 4,890,002 A | * | 12/1989 | Schornack | 307/66 |
| 5,579,197 A | * | 11/1996 | Mengelt et al. | 361/93.4 |
| 6,018,233 A | * | 1/2000 | Glennon | 322/22 |

* cited by examiner

*Primary Examiner*—Robert L. Deberadinis
(74) *Attorney, Agent, or Firm*—Kirton & McConkie; Evan R. Witt

(57) ABSTRACT

An uninterruptible power supply and method for controlling same are disclosed. The controlling method includes the steps of bypassing the first AC power to the output terminal via the bypass loop and the switch and converting a second AC power having a voltage, phase and frequency substantially equal to that of the first AC power by an inverter when the first AC power is normal; and switching the second AC power to the output terminal via the switch when the phase or frequency of the first AC power is changed so as to generate a difference value between the first AC power and the second AC power and the difference value is larger than a predetermined difference value.

18 Claims, 5 Drawing Sheets

UNINTERRUPTIBLE POWER SUPPLY AND METHOD FOR CONTROLLING SAME

FIELD OF THE INVENTION

The present invention is related to a power supply system and the control method thereof, and more particularly to an uninterruptible power supply and the control method thereof.

BACKGROUND OF THE INVENTION

With the rapid progress of information technology and the rapid development of the high-tech industry, most of the sophisticated electronic instruments and equipment rely on high-quality power supply to maintain a normal operation. Among a variety of power-supplying solutions, uninterruptible power supply can ensure a nonstop and a high-quality power supply. Therefore, uninterruptible power supply has become the best solution for providing a high-quality power supply. Because different uninterruptible power supplies have different power conversion efficiency, the use of uninterruptible power supply will pose a 10%-30% surcharge on the utilities every year.

Referring to FIG. 1, the circuitry of a conventional uninterruptible power supply is shown. As shown in FIG. 1, the uninterruptible power supply 1 includes an AC/DC converter 11, a charger circuit 12, a battery module 13, a DC/DC converter 14, an inverter 15, a controller 16, a static transfer switch 17 and a bypass route 18. The function and the association of each circuit elements of the uninterruptible power supply 1 are described as follows.

When the input power source Vin is supplying power normally, the controller 15 will manipulate the AC/DC converter 11 to convert the input AC voltage Vin into a DC voltage having a predetermined voltage level and provide this DC voltage for the charger circuit 12 and the inverter 15. In the meantime, the controller 16 will manipulate the inverter 15 to convert this DC voltage into a standard and reliable AC voltage. The output AC voltage V1 of the inverter 15 is provided for the load 19 through the static transfer switch 17 (where the load voltage Vout is the output AC voltage V1 of the inverter 15). In the meantime, the charger circuit 12 will convert the DC voltage outputted from the AC/DC converter 11 into a DC voltage tailored to charge the battery module 13.

When the input power source Vin is unavailable for supplying power due to blackout or brownout and thereby causing the degradation of power, the controller 16 will manipulate the DC/DC converter 14 to convert the DC voltage outputted from the battery module 13 into a DC voltage required by the inverter 15. Next, the inverter 15 will convert the DC voltage outputted from the DC/DC converter 14 into an AC voltage, which is provided for the load 19 through the static transfer switch 17. In this case, the power used by the load 19 is supplied by the battery module 13 that is formed by a plurality of batteries. More specifically, the duration of the battery module 13 for sustaining supplying power is dependent on the number of batteries of the battery module 13.

When the input power source Vin is supplying power normally, the AC/DC converter 11 of the uninterruptible power supply 1 will convert the input AC voltage Vin into a DC power, and then the inverter 15 will convert the DC power into a standard and reliable AC power. The output AC power V1 of the inverter 15 is provided for the load 15 through the static transfer switch 17. Because the AC/DC converter 11 and the inverter 15 will output energy when the input power source Vin in supplying power normally, the power conversion efficiency of the AC/DC converter 11 and the inverter 15 will lower the power utilization.

In order to improve the power utilization, another operating method for the uninterruptible power supply is proposed. This operating method is carried out in a manner that when the input power source Vin is supplying power normally, the controller 16 will manipulate the static transfer switch 17 to provide the input AC power Vin for the load 19. That is, when the whole system is normal, the input AC power Vin is provided for the load 19 through the bypass route 18. In the meantime, the inverter 15 will perform power conversion process to output AC power through the static transfer switch 17, and the peak voltage of the output voltage V1 of the inverter 15 is a predetermined rated peak voltage Vp1. In the meantime, the charger circuit 12 will convert the DC voltage outputted from the AC/DC converter 11 into a DC voltage tailored to charge the battery module 13.

When the peak voltage or the frequency of the input voltage Vin is abnormal, for example, when the peak voltage is increased or decreased by 10% of the rated peak voltage or when the frequency is increased or decreased by 5% of the rated frequency, the controller 16 will manipulate the static transfer switch 17 to provide the output voltage V1 of the inverter 15 for the load 19 through the static transfer switch 17 (where the load voltage Vout is the output AC voltage V1 of the inverter 15), thereby enhancing power utilization. The uninterruptible power supply employing such control method is called economic-mode uninterruptible power supply, or ECO-mode uninterruptible power supply. Nevertheless, such control method and control configuration is applicable to non-inductive load and non-motorized load. In the case of inductive load and motorized load, when the peak voltage or frequency of the input voltage Vin is abnormal and the static transfer switch 17 switches the power delivery route to provide the output voltage V1 of the inverter 15 for the load 19, the phase difference between the input voltage Vin and the output voltage V1 of the inverter 15 would be large. When the phase difference between the input voltage Vin and the output voltage V1 of the inverter 15 is sufficiently large, for example, above 20 degrees, the uninterruptible power supply would perform asynchronous power conversion and cause inrush current. This would even burn down the uninterruptible power supply and inhibit the uninterruptible power supply from supplying power to the load 19.

Referring to FIG. 2, the waveform diagram showing the voltage waveforms and current waveforms associated with the uninterruptible power supply. As indicated in FIG. 2, the peak voltage, frequency or phase of the input voltage Vin is abnormal at time t1. In the meantime, the controller 16 will manipulate the static transfer switch 17 to switch the power delivery route to provide the output voltage V1 of the inverter 15 for the load 19. However, the phase difference between the input voltage Vin and the output voltage V1 of the inverter 15 is quite large, for example, above 20 degrees, so that a large voltage difference is generated between the load voltage Vout and the output voltage V1 of the inverter 15. Under this condition, the static transfer switch will switch the power delivery route so as to cause a large inrush current on the load current Iout. This would even burn down the uninterruptible power supply and inhibit the uninterruptible power supply from supplying power to the load 19.

Hence, it is urgent for those skilled in the art to develop a control method for use by an uninterruptible power supply to remove the above-mentioned drawbacks encountered by the prior art.

SUMMARY OF THE INVENTION

An object of the present invention is to provide an uninterruptible power supply system and the control method thereof. When the input power of the uninterruptible power supply system is available, the uninterruptible power supply can supply the input power to a load through a bypass route, and the peak voltage, phase and frequency of the inverter of the uninterruptible power supply can be varied synchronously with the power source. On the other hand, when the input power is unstable, the output voltage of the inverter is provided for the load before the voltage difference between the input power and the output voltage of the inverter is enlarged. Therefore, there will be a small inrush current if the load is an inductive load or a motorized load, so that the uninterruptible power supply can be protected from being burned down.

To this end, a preferred embodiment of the present invention is to provide a control method for an uninterruptible power supply, wherein the uninterruptible power supply includes a power input terminal for receiving a first AC voltage, a battery module, an AC/DC converter for receiving the first AC voltage from the power input terminal and converting the first AC voltage into a DC voltage, a charger circuit, an inverter for converting the DC voltage into a second AC voltage, a bypass route, a switch, a controller, and a power output terminal. The control method includes the following steps of: (a) determining if a peak voltage of the first AC voltage, a frequency of the first AC voltage, a phase difference between the first AC voltage and the second AC voltage is abnormal; and (b) when it is determined that the peak voltage of the first AC voltage, the frequency of the first AC voltage, the phase difference between the first AC voltage and the second AC voltage is normal, supplying the first AC voltage to the power output terminal through the bypass route and the switch; and when it is determined that the peak voltage of the first AC voltage, the frequency of the first AC voltage, the phase difference between the first AC voltage and the second AC voltage is abnormal, switching the switch to supply the second AC voltage to the power output terminal.

To this end, another aspect of the present invention is related to a uninterruptible power supply, including a battery module for storing electric power; an AC/DC converter for receiving a first AC voltage from a power input terminal and converting the first AC voltage into a DC voltage; a charger circuit connected to the AC/DC converter and the battery module for charging the battery module; an inverter connected to the AC/DC converter and the charger circuit for converting the DC voltage into a second AC voltage; a bypass route connected to the power input terminal; a switch connected to the bypass route, the inverter and a power output terminal; and a controller connected to the power input terminal, the AC/DC converter, the charger circuit and the inverter for controlling the uninterruptible power supply. The uninterruptible power supply is configured to carry out the following control method: (a) determining if a peak voltage of the first AC voltage, a frequency of the first AC voltage, a phase difference between the first AC voltage and the second AC voltage is abnormal; and (b) when it is determined that the peak voltage of the first AC voltage, the frequency of the first AC voltage, the phase difference between the first AC voltage and the second AC voltage is normal, supplying the first AC voltage to the power output terminal through the bypass route and the switch; and when it is determined that the peak voltage of the first AC voltage, the frequency of the first AC voltage, the phase difference between the first AC voltage and the second AC voltage is abnormal, switching the switch to supply the second AC voltage to the power output terminal.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
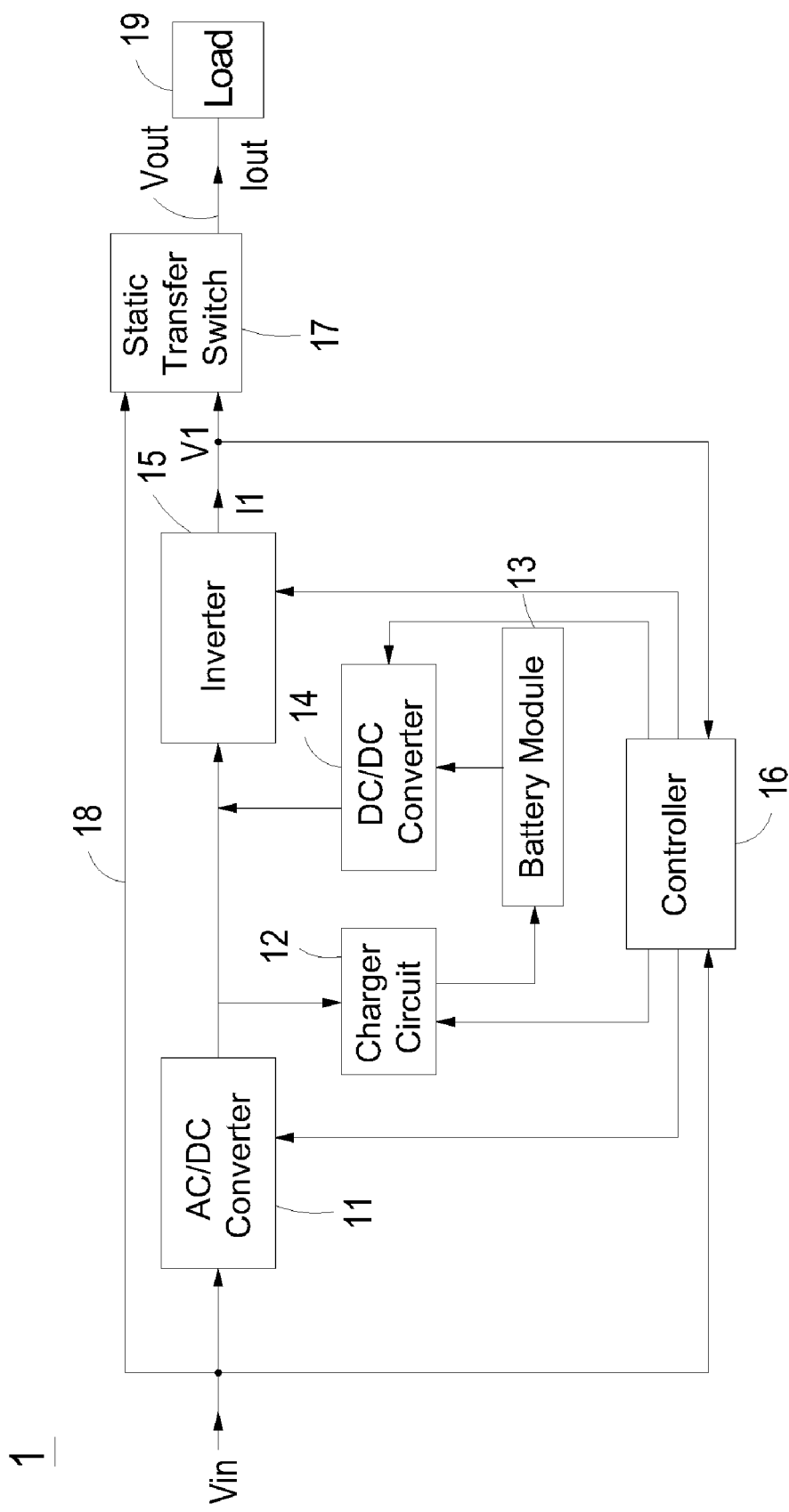
FIG. 1 is a circuit diagram showing a conventional uninterruptible power supply.
Figure 2:
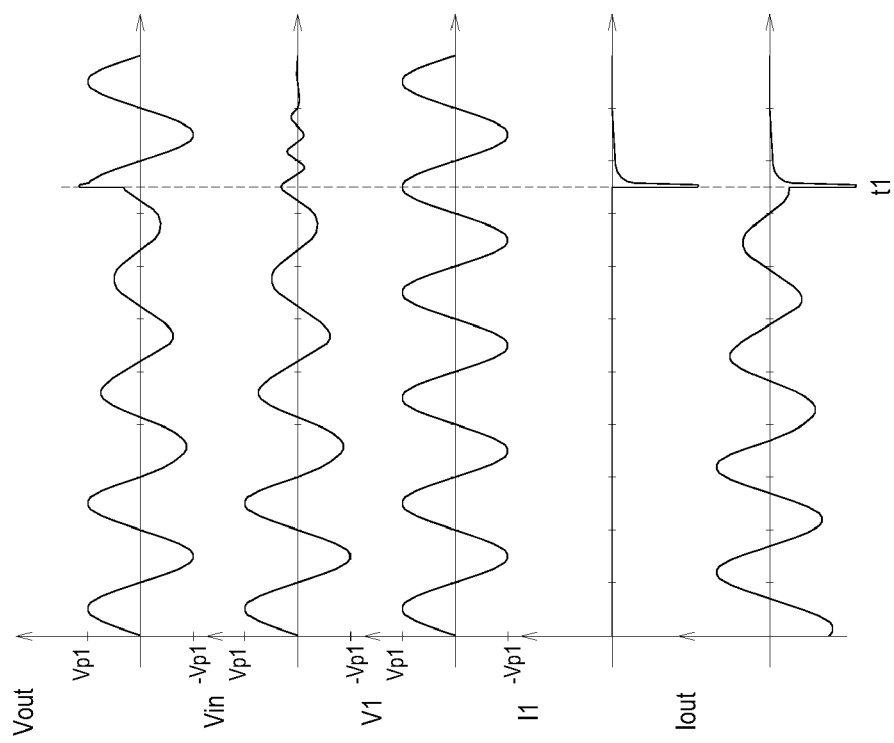
FIG. 2 is a timing diagram showing the waveforms associated with the voltage conversion process carried out by the conventional uninterruptible power supply.
Figure 3:
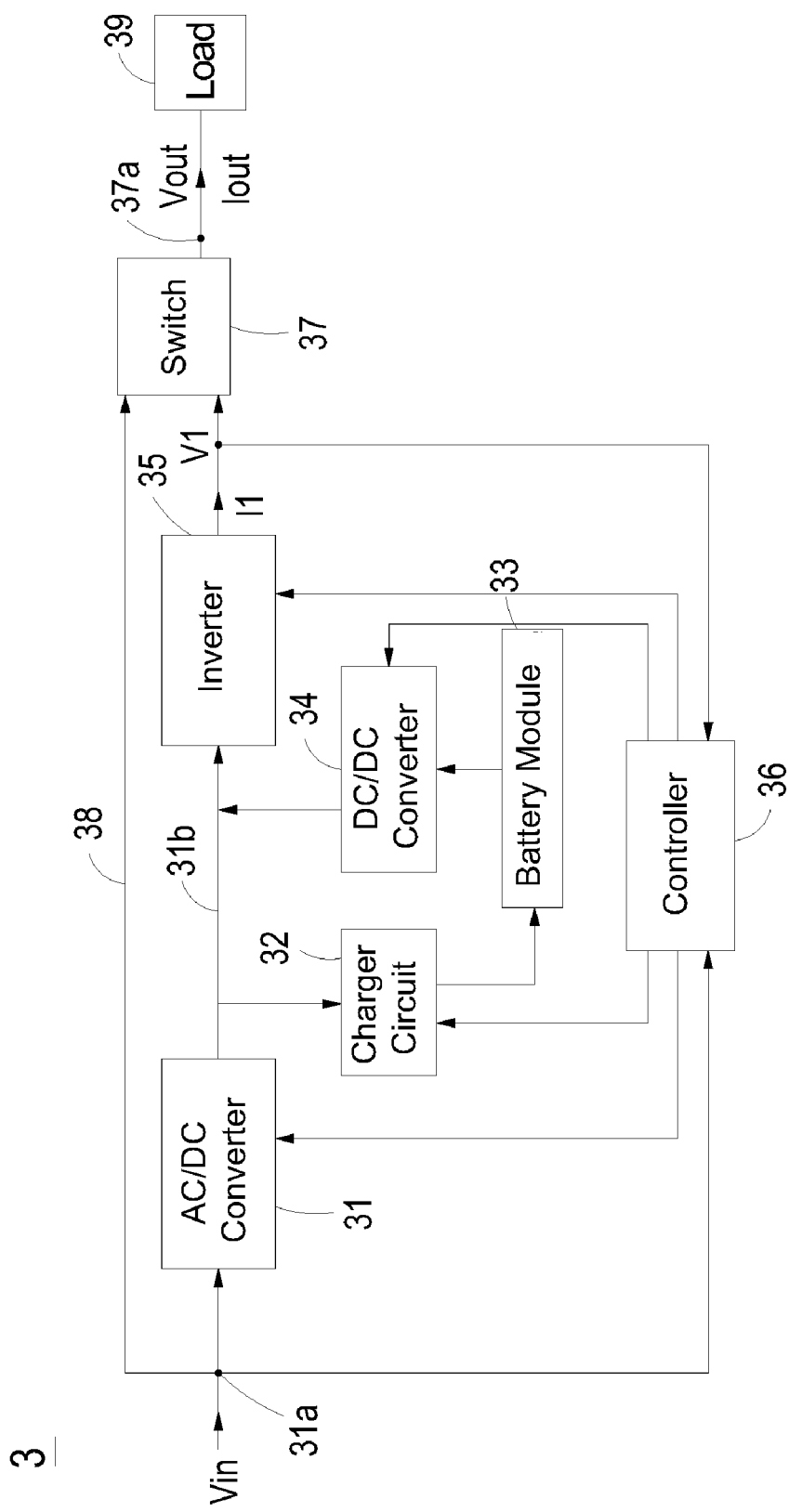
FIG. 3 is a circuit diagram showing an uninterruptible power supply according to a preferred embodiment of the present invention.

FIG. 3 shows the structure of an uninterruptible power supply according to a preferred embodiment of the present invention. As shown in FIG. 3, the inventive uninterruptible power supply 3 includes an AC/DC converter 31, a charger circuit 32, a battery module 33, a DC/DC converter 34, an inverter 35, a controller 36, a switch 37, a power input terminal 31a, a DC bus 31b, a power output terminal 37a, and a bypass route 38. The function and control method of the uninterruptible power supply 3 are described as follows.

In the present embodiment, the power input terminal 31a is configured to receive an input voltage Vin, which is set as a first AC voltage. The AC/DC converter 31 is connected between the power input terminal 31a and the DC bus 31b for converting the first AC voltage Vin into a DC voltage having a predetermined voltage level. The charger circuit 32 is connected between the DC bus 31b and the battery module 33 for converting the DC voltage outputted from the AC/DC converter 31 into a DC voltage tailored to charge the battery module 33. The DC/DC converter 34 is connected between the battery module 33 and the DC bus 31b for converting the DC voltage of the battery module 33 into a DC voltage required by the inverter 35. The inverter 35 is connected between the DC bus 31b and the switch 37 for converting the DC voltage of the DC bus 31b into a standard and reliable output AC voltage V1, which is set as a second AC voltage. The switch 37 is connected to the bypass route 38, the inverter 35 and the power output terminal 37a, and can be implemented by a silicon controlled rectifier (SCR), a triode AC switch (TRIAC), an insulated gate bipolar transistor (IGBT), a MOSFET, or a relay. The bypass route 38 is connected between the switch 37 and the power input terminal 31*a*, and the controller 36 is connected to the power input terminal 31*a*, the AC/DC converter 31, the charger circuit 32, the DC/DC converter 34 and the inverter 35 for controlling the operation of the uninterruptible power supply 3.

Figure 4:
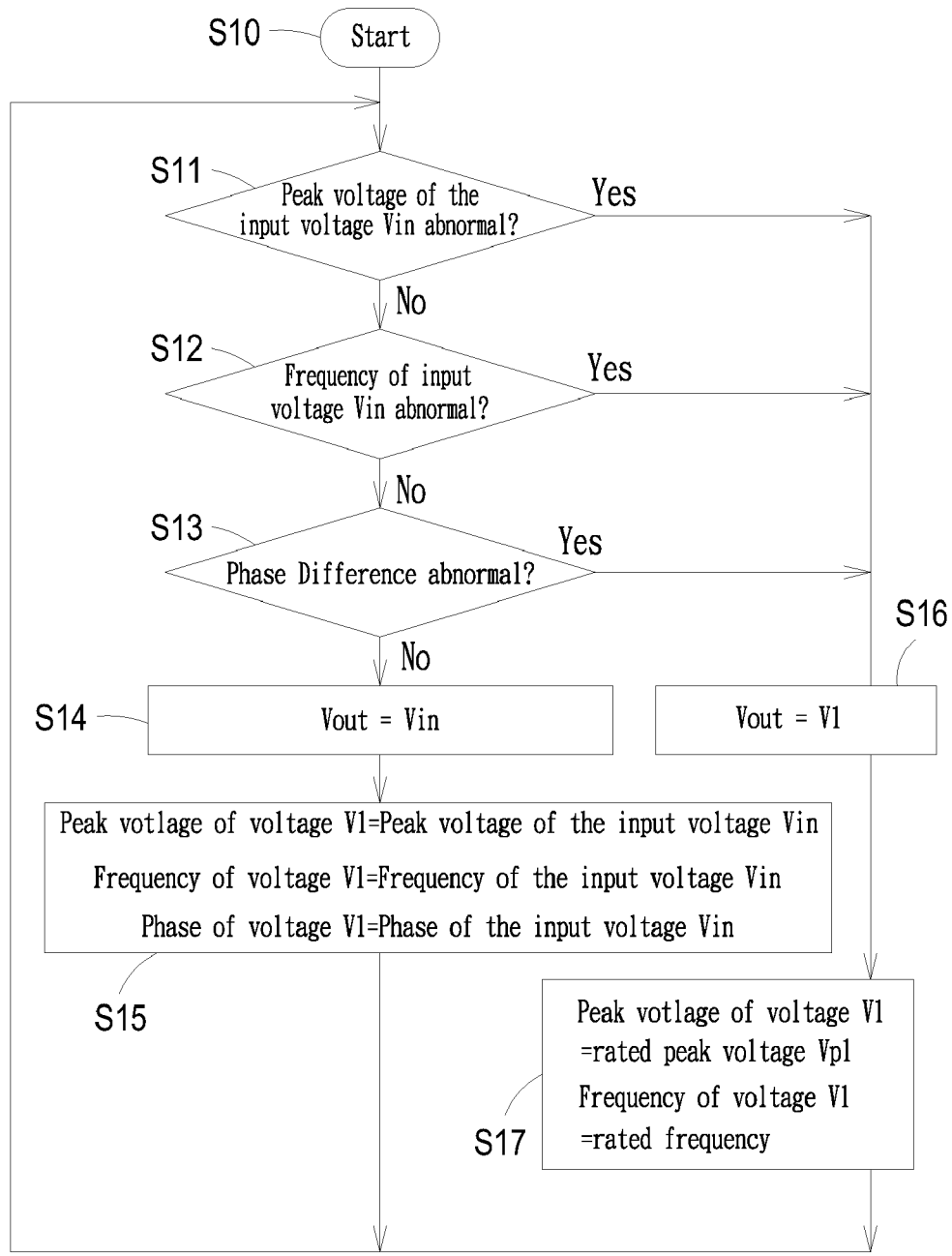
FIG. 4 is a flowchart illustrating the control steps applied to the uninterruptible power supply according to a preferred embodiment of the present invention.

Referring to FIG. 4, the flowchart illustrating the control method for use by the uninterruptible power supply according to the present invention is shown. As shown in FIG. 4, the steps of the control method are described as follows:

Step S10: Start the control procedure for use by the uninterruptible power supply.

Step S11: Determine if the peak voltage of the input voltage Vin is abnormal. In the present embodiment, if the peak voltage of the input voltage Vin is increased or decreased by a predetermined percentage of the rated peak voltage, for example, ±10%, it is determined that the peak voltage of the input voltage Vin is abnormal. If it is determined that the peak voltage of the input voltage Vin is abnormal, the method continues with step S16;

Step S12: Determine if the frequency of the input voltage Vin is abnormal. In the present embodiment, if the frequency of the input voltage Vin is increased or decreased by a predetermined percentage of the rated frequency, for example, ±5%, it is determined that the frequency of the input voltage Vin is abnormal. If it is determined that the frequency of the input voltage Vin is abnormal, the method continues with step S16;

Step S13: Determine if the phase difference between the input voltage Vin and the output voltage Vl of the inverter 35 is abnormal. In the present embodiment, if the phase different exceeds a predetermined phase difference, for example, 10 degrees, it is determined that the phase difference between the input voltage Vin and the output voltage V1 of the inverter 35 is abnormal. If the phase difference between the input voltage Vin and the output voltage V1 of the inverter 35 is abnormal, the method continues with step S16;

Step S14: Provide the input voltage Vin for the load 39 through the switch 37. That is, the input voltage Vin is provided for the load 39 through the bypass route 38. Under this condition, the load voltage Vout is the same as the input voltage Vin.

Step S15: Adjust peak voltage and the phase of the output voltage V1 of the inverter 35 to be identical with those of the input voltage Vin. That is, the peak voltage and the phase of the output voltage V1 of the inverter 35 will vary synchronously with the peak voltage of the input voltage Vin. In some alternative embodiments, the frequency of the output voltage V1 of the inverter 35 is the same with the frequency of the input voltage Vin, so that the frequency of the output voltage V1 of the inverter 35 will vary synchronously with the frequency of the input voltage Vin. Next, the method continues with step S11.

Step S16: Provide the output voltage V1 of the inverter 35 for the load 39 through the switch 37. Under this condition, the load voltage Vout is the same as the output voltage V1 of the inverter 35.

Step S17: Adjust the peak voltage of the output voltage V1 of the inverter 35 to be identical to the rated peak voltage Vp1. In some alternative embodiments, the frequency of the output voltage V1 of the inverter 35 is adjusted to be identical to the rated frequency. Next, the method continues with step S11.

The above-mentioned control method will be executed repetitively, so that the uninterruptible power supply can supply electric power to the load 39 stably. Certainly, in other alternative embodiments the sequence of the steps S11 to S13 can be altered.

Figure 5:
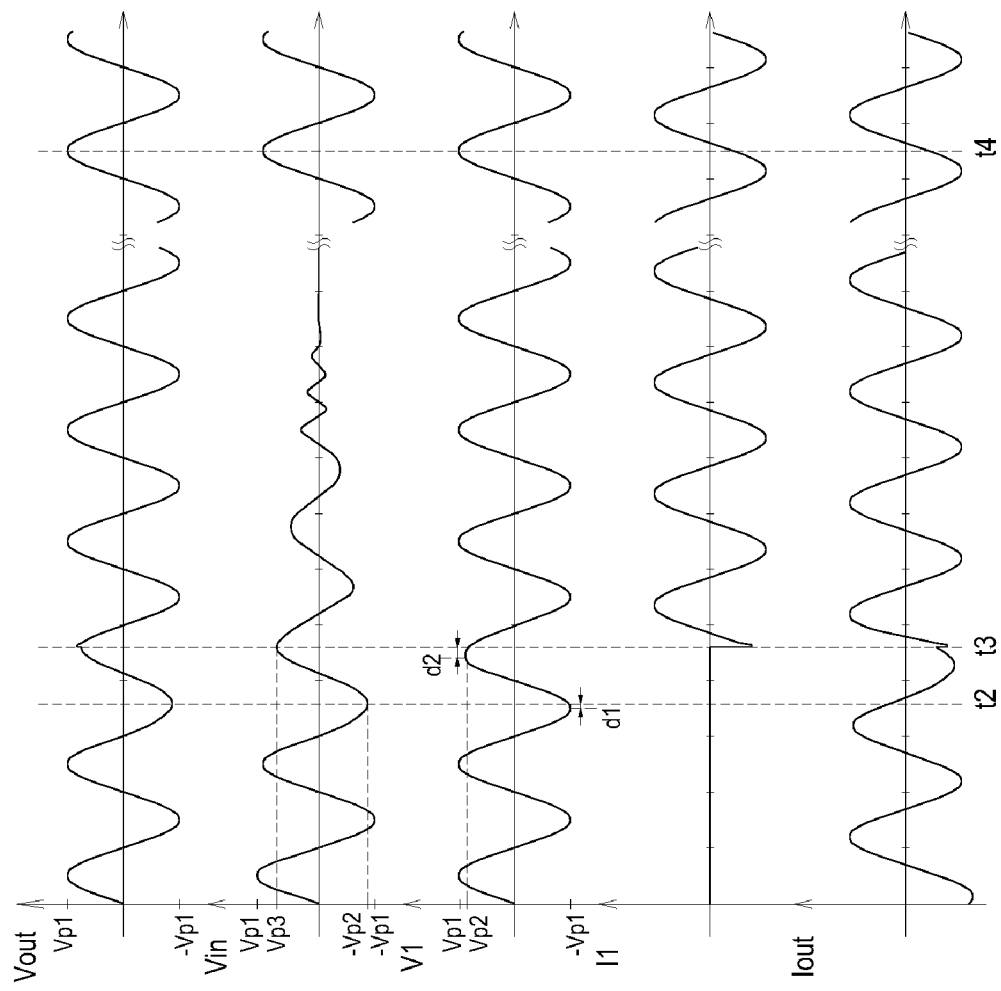
FIG. 5 is a timing diagram showing the waveforms associated with the voltage conversion process carried out by the uninterruptible power supply of the present invention.

FIG. 5 shows the waveforms associated with the power conversion process carried out by the uninterruptible power supply according to the present invention. As shown in FIG. 3 and FIG. 5, the input voltage Vin, that is, the first AC voltage, will be available before time t2, and the controller 36 will manipulate the switch 37 to supply the input voltage Vin to the load 39. That is, the input voltage Vin will be provided for the load 39 through the bypass route 38. Meanwhile, the AC/DC converter 31 will convert the input voltage Vin into a DC voltage, and the inverter 35 will convert this DC voltage into a stable output voltage V1, which is the second AC voltage. In some alternative embodiments, the frequency of the output voltage V1 of the inverter 35 is the same with that of the input voltage Vin, so that the frequency of the output voltage V1 of the inverter 35 will vary synchronously with the frequency of the input voltage Vin. In addition, the controller 36 will manipulate the inverter 35 so that the peak voltage and phase of the output voltage V1 of the inverter 35 will be the same with those of the input voltage Vin. That is, the peak voltage and phase of the output voltage V1 of the inverter 35 will vary synchronously with the peak voltage and phase of the input voltage Vin. In the meantime, if the capacity of the battery module 33 is insufficient, the charger circuit 32 can convert the DC voltage outputted from the AC/DC converter 31 into a DC voltage tailored to charge the battery module 33, thereby charging the battery module 33.

In the present embodiment, although the inverter 35 is still in operation, the load 39 is powered by the input voltage Vin. Under this condition, the output current It of the inverter 35 is zero, and the whole uninterruptible power supply 3 will consume energy only when the battery module 33 is charging, and thus the power efficiency of the uninterruptible power supply 3 is quite high.

Referring to FIG. 3 and FIG. 5 again, the peak voltage of the input voltage (that is, the first AC voltage) is maintained at the rated peak voltage Vp1 before time t2. However, the peak voltage of the input voltage Vin will be lowered from the rated peak voltage Vp1 to a second peak voltage Vp2 at time t2. Also, the phase and frequency of the output voltage V1 of the inverter 35 will be changed rapidly so that the output voltage V1 (that is, the second AC voltage) of the inverter 35 can not be synchronized with the input voltage Vin. However, the rapid change of the phase and frequency of the input voltage Vin causes the phase difference between the input voltage Vin and the output voltage V1 of the inverter 35. Therefore, a first phase difference d1 is generated between the input voltage Vin and the output voltage V1 of the inverter 35 at time t2. With the continuing instability of the input voltage Vin, the phase difference will be enlarged with time. At time t3, a second phase difference d2 between the input voltage Vin and the output voltage V1 of the inverter 35 is generated and exceeds a predetermined phase difference, for example, 10 degrees, and thus the controller 36 will manipulate the switch 37 to switch the power delivery route to supply the output voltage V1 of the inverter 35 to the load 39.

The peak voltage of the output voltage Vl of the inverter 35 is subject to change with the input voltage Vin. In some alternative embodiments, the frequency of the output voltage V1 of the inverter 35 is subject to change with the frequency of the input voltage Vin. At time t3, the voltage difference between the input voltage Vin and the output voltage V1 of the inverter 35 is caused by the second phase difference d2. The controller 36 can use the voltage difference between the input voltage Vin and the output voltage V1 of the inverter 35 to detect if the input voltage Vin is stable. Before the phase difference between the input voltage Vin and the output voltage V1 of the inverter 35 is enlarged, the switch 37 operates to switch the power delivery route so that the output voltage V1 of the inverter 35 is supplied to the load 39. In the meantime, the second phase difference d2 will limit the voltage difference between the input voltage Vin and the output voltage V1 of the inverter 35. Although the load 39 is an inductive load or a motorized load, the load current Iout and the output current I1 of the inverter 35 will not cause a large inrush current when the switch 37 switches the power delivery route to supply the output voltage V1 of the inverter 35 to the load 39 at time t3. Therefore, the uninterruptible power supply will be protected from being burned down and the load will be continuously powered.

After the power delivery route is switched, that is, after time t3 is elapsed, the controller 36 will manipulate the inverter 35 to adjust the peak voltage of the output voltage V1 to the rated peak voltage Vp1. In some alternative embodiments, the frequency of the output voltage V1 of the inverter 35 will be adjusted to the rated frequency. In the meantime, the peak voltage and frequency of the load voltage Vout are identical to the rated peak voltage Vp1 and rated frequency, respectively. Even if the input voltage Vin is unavailable, the DC/DC converter 34 can convert the voltage of the battery module 33 into the required voltage for the inverter 35, so that the uninterruptible power supply 3 can supply electric power to the load 39 stably. In some alternative embodiments, the battery module 33 can be made up of a plurality of batteries, and its power supplying time is dependent on the number of batteries. Certainly, the DC/DC converter can be an optional element in some alternative embodiments. In such embodiments, the battery module will be directly connected to the DC bus (not shown), and a switch circuit is arranged to control if the battery module is supplying power to the DC bus.

Another situation that may occur during operation is that the peak voltage of the input voltage Vin decreases or increases to a level being unbearable for the load 39. In the present embodiment, the peak voltage of the input voltage Vin is set to decrease or increase by a predetermined percentage of the rated peak voltage, for example, 10%. In this case, the controller 36 will manipulate the switch 37 to switch the power delivery route so that the output voltage V1 of the inverter 35 is provided for the load 39. After the power delivery route is switched, the controller 36 will manipulate the inverter 35 to adjust the peak voltage of the output voltage V1 to be identical to the rated peak voltage Vp1. In some alternative embodiments, the frequency of the output voltage V1 of the inverter 35 will be adjusted to be identical to the rated frequency. It should be noted that the peak voltage of the output voltage V1 of the inverter 35 varies synchronously with the peak voltage of the input voltage Vin, and the frequency of the output voltage V1 of the inverter 35 varies synchronously with the frequency of the input voltage Vin in some alternative embodiments, the voltage difference between the output voltage V1 of the inverter 35 and the input voltage Vin is limited. Although the load 39 is an inductive load or a motorized load, the load current Iout and the output current I1 of the inverter 35 will not cause a large inrush current when the switch 37 switches the power delivery route to supply the output voltage V1 of the inverter 35 to the load 39. Therefore, the uninterruptible power supply 3 will be protected from being burned down and the load 39 will be continuously powered.

Likewise, after a period of time, the peak voltage of the input voltage Vin returns to normal. The output voltage V1 of the inverter 35 will be synchronous with the input voltage Vin, that is, the phase difference between the output voltage V1 of the inverter 35 and the input voltage Vin will be zero, and their peak voltage and frequency are the same, as shown in the waveforms after time t4 in FIG. 5. In the meantime, the controller 36 will manipulate the switch 37 to supply the input voltage Vin to the load 39 through the bypass route 38.

In conclusion, the uninterruptible power supply and the control method thereof according to the present invention is able to allow the uninterruptible power supply to supply power to the load 39 through a bypass route when the input voltage Vin is normal, and the peak voltage and phase and frequency of the output voltage V1 of the inverter 35 is varied synchronously with the peak voltage and phase and frequency of the input voltage Vin. When the input voltage Vin is unstable, the input voltage Vin is not synchronous with the output voltage V1 of the inverter 35 and a phase difference is generated thereby. Before the phase difference is enlarged, the controller 36 manipulates the switch 37 to switch the power delivery route to supply the output voltage V1 of the inverter 35 to the load 39. Therefore, even if the load 39 is an inductive load or a motorized load, the uninterruptible power supply can be protected from being burned down due to the large inrush current. Also, the load can be continuously powered and the power efficiency can be improved.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A control method for an uninterruptible power supply having a power input terminal for receiving a first AC voltage, a battery module, an AC/DC converter for receiving the first AC voltage through the power input terminal and converting the first AC voltage into a DC voltage, a charger circuit, an inverter for converting the DC voltage into a second AC voltage, a bypass route, a switch, a controller, and a power output terminal, the control method comprising the steps of:
   (a) determining if a peak voltage of the first AC voltage, a frequency of the first AC voltage, or a phase difference between the first AC voltage and the second AC voltage is abnormal; and
   (b) if it is determined that the peak voltage of the first AC voltage, the frequency of the first AC voltage, or the phase difference between the first AC voltage and the second AC voltage is normal, supplying the first AC voltage to the power output terminal through the bypass route and the switch, wherein the peak voltage, phase and frequency of the second AC voltage are substantially identical to those of the first AC voltage; and if it is determined that the peak voltage of the first AC voltage, the frequency of the first AC voltage, or the phase difference between the first AC voltage and the second AC voltage is abnormal, switching the switch to supply the second AC voltage to the power output terminal through the switch, and then the peak voltage and frequency of the second AC voltage being respectively adjusted to a rated peak voltage and a rated frequency of the first AC voltage.

2. The control method according to claim 1 wherein at the step (a), if the peak voltage of the first AC voltage increases or decreases by a predetermined percentage of a rated peak voltage of the first AC voltage, determining the first AC voltage to be abnormal.

3. The control method according to claim 2 wherein the predetermined percentage is substantially +10%.

4. The control method according to claim 1 wherein at the step (a), if the frequency of the first AC voltage increases or decreases by a predetermined percentage of a rated frequency of the first AC voltage, determining the frequency of the first AC voltage to be abnormal.

5. The control method according to claim 4 wherein the predetermined percentage is substantially 5%.

6. The control method according to claim 1 wherein at the step (a), if the phase difference increases or decreases by a predetermined phase difference, determining the phase difference between the first AC voltage and the second AC voltage to be abnormal.

7. The control method according to claim 6 wherein the predetermined phase difference is 10 degrees.

8. The control method according to claim 1 wherein:
the battery module is configured to store electric power;
the charger circuit is connected to the AC/DC converter and the battery module for charging the battery module;
the inverter is connected to the AC/DC converter and the charger circuit for converting the DC voltage into the second AC voltage;
the bypass route is connected to the power input terminal;
the switch is connected to the bypass route, the inverter and the power output terminal; and
the controller is connected to the power input terminal, the AC/DC converter, the charger circuit and the inverter for controlling the operation of the uninterruptible power supply.

9. The control method according to claim 8 wherein the uninterruptible power supply is further comprises a DC/DC converter connected to the battery module, the controller and the inverter for converting a DC voltage of the battery module into a voltage required by the inverter.

10. The control method according to claim 8 wherein when the first AC voltage is normal and the capacity of the battery module is insufficient, the charger circuit converts the DC voltage into a DC voltage tailored to charge the battery module.

11. The control method according to claim 8 wherein the switch is a silicon controlled rectifier, a triode AC switch, an insulated gate bipolar transistor, a MOSFET, or a relay.

12. The control method according to claim 1 wherein the first AC voltage is a commercially available power.

13. The control method according to claim 1 wherein the power output terminal is connected to a load.

14. The control method according to claim 13 wherein the load is an inductive load or a motorized load.

15. An uninterruptible power supply, comprising:
a battery module for storing electric energy;
an AC/DC converter for receiving a first AC voltage from a power input terminal and converting the first AC voltage into a DC voltage;
a charger circuit connected to the AC/DC converter and the battery module for charging the battery module;
an inverter connected to the AC/DC converter and the charger circuit for converting the DC voltage into a second AC voltage;
a bypass route connected to the power input terminal;
a switch connected with the bypass route, the inverter, and a power output terminal; and
a controller connected with the power input terminal, the AC/DC converter, the charger circuit, and the inverter for controlling the uninterruptible power supply to perform a voltage regulating process comprising the steps of:
(a) determining if a peak voltage of the first AC voltage, a frequency of the first AC voltage, or a phase difference between the first AC voltage and the second AC voltage is abnormal;
(b) if it is determined that the peak voltage of the first AC voltage, the frequency of the first AC voltage, or the phase difference between the first AC voltage and the second AC voltage is normal, supplying the first AC voltage to the power output terminal through the bypass route and the switch, wherein the peak voltage, phase and frequency of the second AC voltage are substantially identical to those of the first AC voltage; and if it is determined that the peak voltage of the first AC voltage, the frequency of the first AC voltage, or the phase difference between the first AC voltage and the second AC voltage is abnormal, switching the switch to supply the second AC voltage to the power output terminal through the switch, and then the peak voltage and frequency of the second AC voltage being respectively adjusted to a rated peak voltage and a rated frequency of the first AC voltage.

16. The uninterruptible power supply according to claim 15 further comprising a DC/DC converter connected to the battery module, the controller and the inverter for converting a DC voltage of the battery module into a voltage required by the inverter.

17. The uninterruptible power supply according to claim 15 wherein when the first AC voltage is normal and the capacity of the battery module is insufficient, the charger circuit converts the DC voltage into a DC voltage tailored to charge the battery module.

18. The uninterruptible power supply according to claim 15 wherein the switch is a silicon controlled rectifier, a triode AC switch, an insulated gate bipolar transistor, a MOSFET, or a relay.

* * * * *